(12) United States Patent
Arellano

(10) Patent No.: US 7,162,494 B2
(45) Date of Patent: Jan. 9, 2007

(54) METHOD AND SYSTEM FOR DISTRIBUTED USER PROFILING

(75) Inventor: Javier B. Arellano, Austin, TX (US)

(73) Assignee: SBC Technology Resources, Inc., Austin, TX (US)

(*) Notice: Subject to any disclaimer, the term of this patent is extended or adjusted under 35 U.S.C. 154(b) by 348 days.

(21) Appl. No.: 10/157,366

(22) Filed: May 29, 2002

(65) Prior Publication Data

US 2003/0225785 A1 Dec. 4, 2003

(51) Int. Cl.
*G06F 17/30* (2006.01)

(52) U.S. Cl. ........................... 707/104.1; 707/1

(58) Field of Classification Search ............. 707/1–10, 707/100–104.1, 200–206; 709/202, 224, 709/217; 706/47; 705/10
See application file for complete search history.

(56) References Cited

U.S. PATENT DOCUMENTS

| | | | | |
|---|---|---|---|---|
| 5,655,081 A * | 8/1997 | Bonnell et al. | ............. | 709/202 |
| 5,710,884 A * | 1/1998 | Dedrick | ....................... | 709/217 |
| 5,848,396 A | 12/1998 | Gerace | ........................ | 705/10 |
| 5,958,010 A * | 9/1999 | Agarwal et al. | ............. | 709/224 |
| 5,991,735 A * | 11/1999 | Gerace | ........................ | 705/10 |
| 6,012,051 A | 1/2000 | Sammon, Jr. et al. | ........ | 706/52 |
| 6,199,067 B1 * | 3/2001 | Geller | .......................... | 707/10 |
| 6,236,978 B1 | 5/2001 | Tuzhilin | ....................... | 705/26 |
| 6,236,983 B1 * | 5/2001 | Hofmann et al. | .............. | 706/47 |
| 6,311,194 B1 | 10/2001 | Sheth et al. | ................. | 717/505 |
| 6,327,590 B1 | 12/2001 | Chidlovskii et al. | ........... | 707/5 |
| 6,449,632 B1 * | 9/2002 | David et al. | ................. | 709/202 |
| 6,546,390 B1 * | 4/2003 | Pollack et al. | .................. | 707/7 |
| 6,691,106 B1 * | 2/2004 | Sathyanarayan | ............... | 707/3 |
| 2002/0029267 A1 | 3/2002 | Sankuratripati et al. | | |
| 2002/0032754 A1 | 3/2002 | Logston et al. | | |

* cited by examiner

*Primary Examiner*—Jeffrey Gaffin
*Assistant Examiner*—Yicun Wu
(74) *Attorney, Agent, or Firm*—Baker Botts L.L.P.

(57) ABSTRACT

A data processing method and network for collecting, storing, and providing user profile data. The network comprises a number of persona agents, interconnected to a hub. The persona agents and the hub are stored within the data communications network. Each persona agent is associated with a user of the data communications network, and is operable to collect observational data from an application being executed by the user, as well to receive queries for profile data from the application and to respond to the queries with context-based profile data.

17 Claims, 4 Drawing Sheets

```
<up:profile_component
segment_name="mysegment101_agent_name="prfag23221" user_name="jarellano565666">
    <up:profile_feature agent_name="prfag23221" user_name="jarellano565666">
```

`<myprof:purchase> appliance </myprof:purchase>`  // profile element

```
        <up:feature_signature>                         // feature signature
            <up:confidence> 0.80 </up:confidence>      // maximum confidence
            <up:origin> system </up:origin>            // defined by user
            <up:duration> 0/00/0000 </up:duration>     // indefinite
            <up:preservation> False </up:preservation> // historical
            <up:permission>                            // per privacy preferences
                <up:url> url="~/jarellano565666./std_pref.appel" </up:url>
            </up:permission>                           //
        </up:feature_signature>

<up:context_signature>                         // context signature
            <up:device_profile>                        // two device profiles
                <up:bag>                               //
                    <up:url> url="http://www.desktops.com/model202" </up:url>
                    <up:url> url="http://www.laptops.com/modelx12" </up:url>
                </up:bag>
            </up:device_profile>
            <up:location_profile>                      // location-independent
                <up:url> url="*" </up:url>
            </up:location_profile>
            <up:temporal_profile>                      // time-independent
                <up:url> url="*" </up:url>
            </up:temporal_profile>
            <up:document_profile>                      // shopping-related
                <up:url>
                    url="http://www.shoppingmecca.com/catalog/housewares/breadmaker09
                    48384"</up:url>
            </up:document_profile>
            <up:network_profile>                       // broadband capable network
                <up:url> url="http://www.swbell.net/profile/dsl/network.xml" </up:url>
            </up:network_profile>
        </up:context_signature>

</up:profile_feature>
</up:profile_component>
```

*FIG. 4*

METHOD AND SYSTEM FOR DISTRIBUTED USER PROFILING

TECHNICAL FIELD OF THE INVENTION

This invention relates to Internet data communications, and more particularly to systems and methods for collecting, managing, and distributing user profile data over the Internet.

BACKGROUND OF THE INVENTION

The information network known as the world-wide-web (WWW) is a subset of the Internet. Information is stored on web pages, which are stored on Internet connected servers. Anyone with an Internet accessible device, such as a personal computer, and an Internet connection may go on-line and navigate web pages. Today's WWW offers users many opportunities for purchasing goods and services, as well as simply obtaining information, from various web sites. Hosts of these web sites are referred to collectively herein as "service providers".

From the service provider's point of view, it is often desirable to collect personal information about actual or potential users. This information is then used for such purposes as improving the quality of services or for targeting advertisements.

There are a variety of known methods for obtaining information about users who visit websites online. Some commonly know methods are sending and retrieving cookies, conducting on-line surveys, and recording website histories. In the past, a typical user profile was compiled by a service provider of a particular website and not necessarily shared with other service providers. Thus, the profile contents tended to relate only to the business of the service provider. In recent years, however, profile "brokering" enterprises have developed whose purpose is to collect profile information for the purpose of selling it to service providers.

BRIEF DESCRIPTION OF THE DRAWINGS

FIG. 4 illustrates an example of a profile segment.

DETAILED DESCRIPTION OF THE INVENTION

The invention described herein is directed to a method and system for distributing user profiles over a network. As explained below, the user profiling is both multi-segmented and context-sensitive. A network of agent hubs acts as an infrastructure within a given communications network, such as that provided by the Internet. The agent hubs host persona agents, whose interaction can be viewed as a network of consumers and producers of profile data, where at any given time a persona agent can be placed in either role.

The profile distribution topology described herein is decentralized and semi-autonomous. This topology is believed to be best suited for the overwhelming stream of raw user data available in today's data communication environments, and suited for future environments.

There are significant motivating factors for providing decentralized profiling. Privacy demands call for not having all personal data in one logical location. Storing and scalability demands limit the storage of enormous amounts of raw observational data, which could occur if all data were stored at a single device or server. Computational demands arising from data volume further constrain the ability of a single server to perform all processing of profile data.

Figure 1:
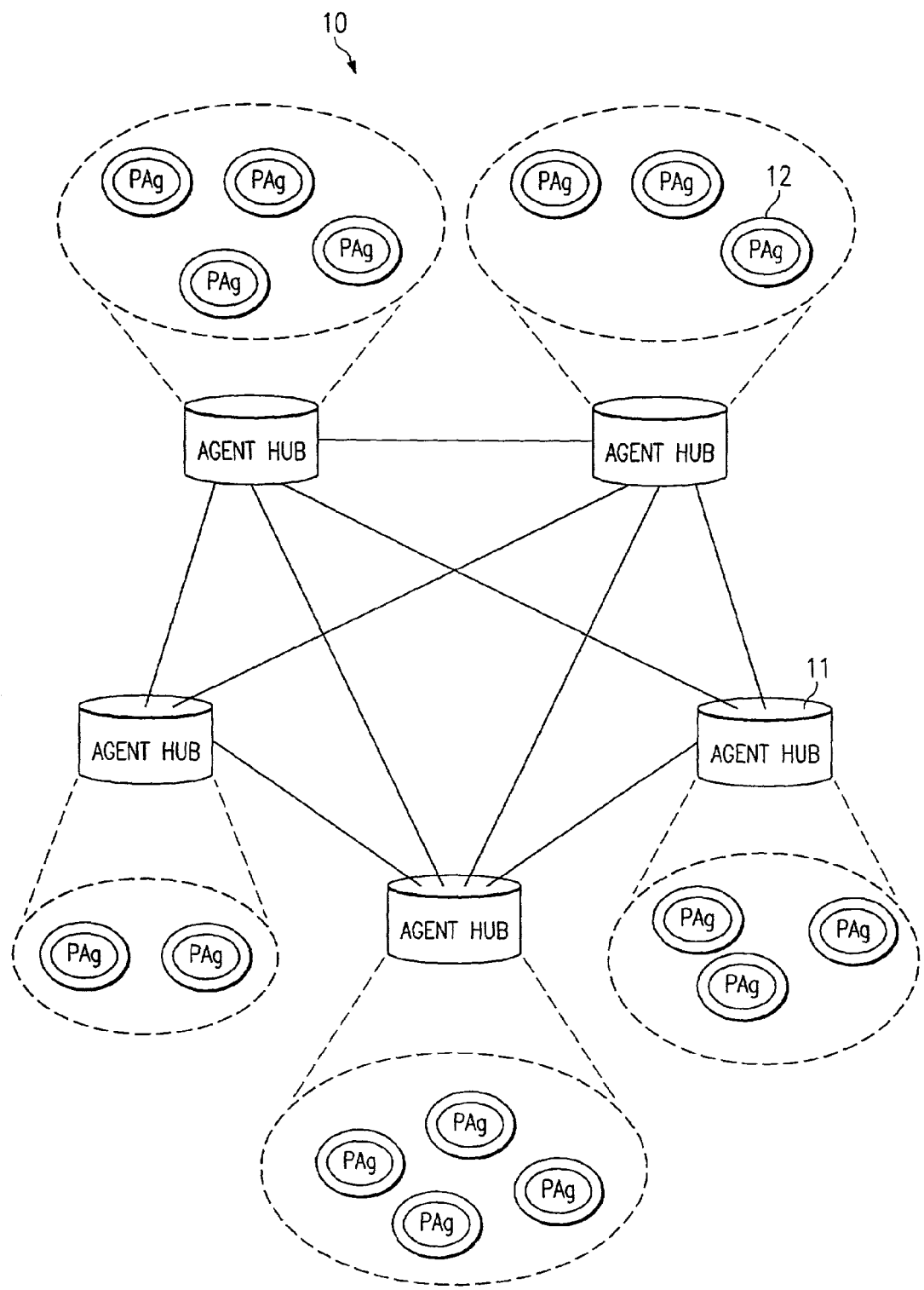
FIG. 1 illustrates a user profiling network in accordance with the invention.

FIG. 1 illustrates a profiling network 10, having a number of interconnected agent hubs 11. Each hub 11 is associated with a number of persona agents 12.

Network 10 is essentially a "processing network" in the sense that persona agents 12 and hubs 11 are software implemented processes. They operate within a data communications environment, such as the Internet. The residence of these processes is flexible, thus a persona agent 12 might reside on an end user device, but could alternatively reside on a server device and be downloadable to an end user device in a manner similar to cookies. In the case of the persona agent residing on an end user device, an example might be a persona agent that acts with a web browser, in a proxy relationship. The persona agent could be initiated by the user or built into the browser so that it operates automatically.

Typically, hubs 11 reside on server devices. As a simple example of network 10, a home network might have a hub that maintains one or more persona agents for each user of the home network. Each user of the communications network has at least one persona agent 12, but as explained below, a feature of the invention is that a single user may have a number of different persona agents depending on the context of the user's activity online the communications network.

Each agent hub 11 defines its agent's horizon. An agent hub 11 aggregates one or more persona agents 12, where each persona agent 12 represents a user within the horizon of the agent hub 11. Examples of the horizon of a hub 11 could be a home networking environment, a single device, or a corporate intranet. A hub 11 hosts multiple agents 12 and acts as their proxy to other hubs 11. In general, other hubs 11 host other agents 12, but some of those agents 12 could represent some of the same users.

The use of hubs 11 permits the details of the profiling semantics to be hidden. It also decouples the persona agents 12 from the network, such that each hub 11 may serve as a conduit for network communications.

Figure 2:
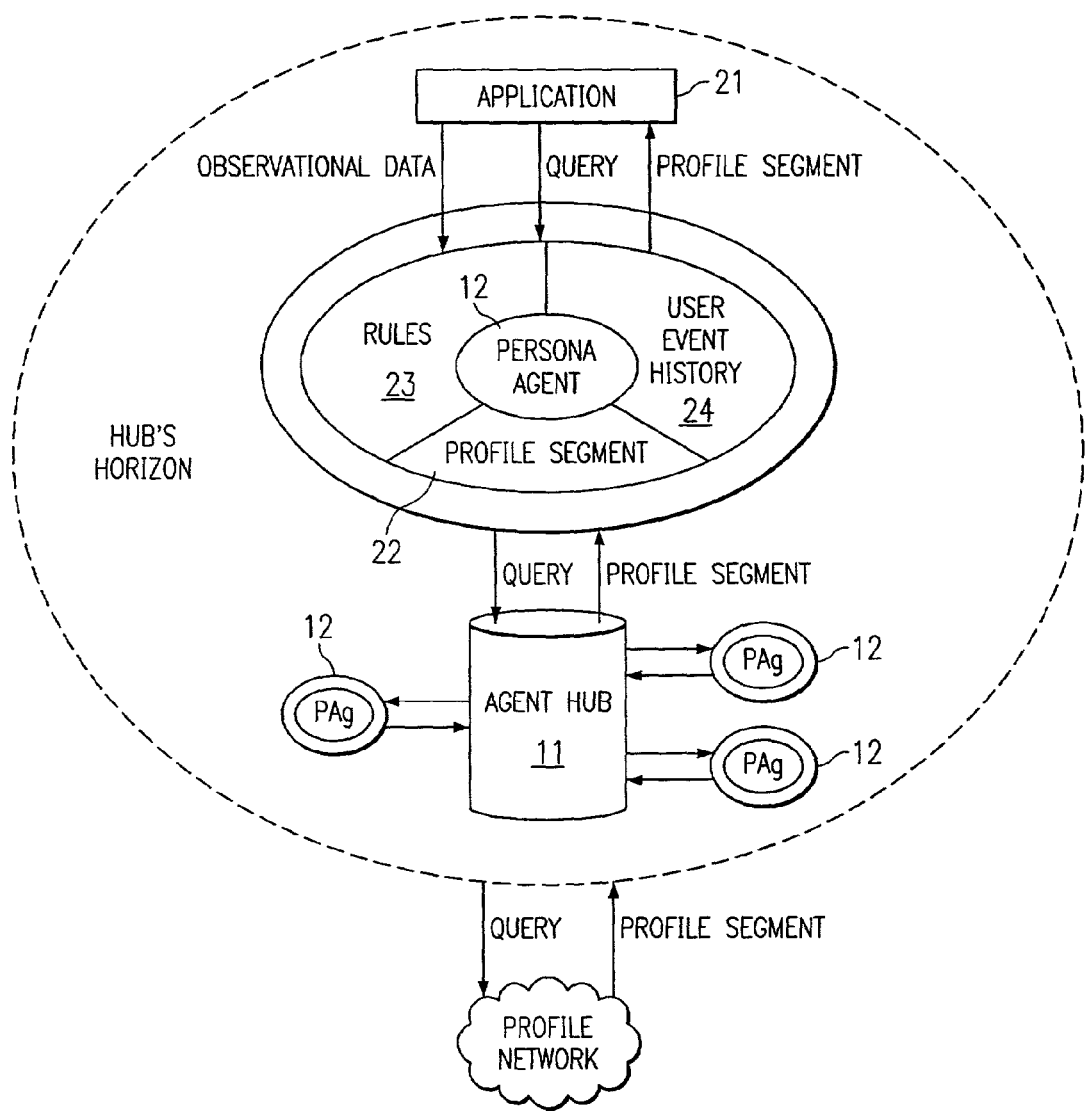
FIG. 2 illustrates one of the persona agents of FIG. 1 in further detail.

FIG. 2 illustrates a persona agent 12 in further detail. A persona agent 12 is the proxy of a local profile, referred to herein as a profile segment 22. Details of a profile segment 22 are described below in connection with FIG. 3.

In general, a persona agent 12 maintains profile data. In addition to its maintenance functions, a persona agent 12 has several specific tasks. It negotiates with any application 21 that is requesting profile data. It captures raw observational data as provided by an application 21. It mines the observational data and produces new assertions for the profile segment 22. It acts upon built-in rules 23 that are specified by the profile owner, the profile service provider, the agent, or all of these.

A reciprocal relationship exists between application 21 and persona agent 12. Persona agent 12 commits to provide a profile segment 22 as requested by application 21, and application 21 commits to feeding back observational data to the persona agent 12. As explained below, the observational data is subsequently analyzed using a data mining process of the persona agent 12.

Figure 3:
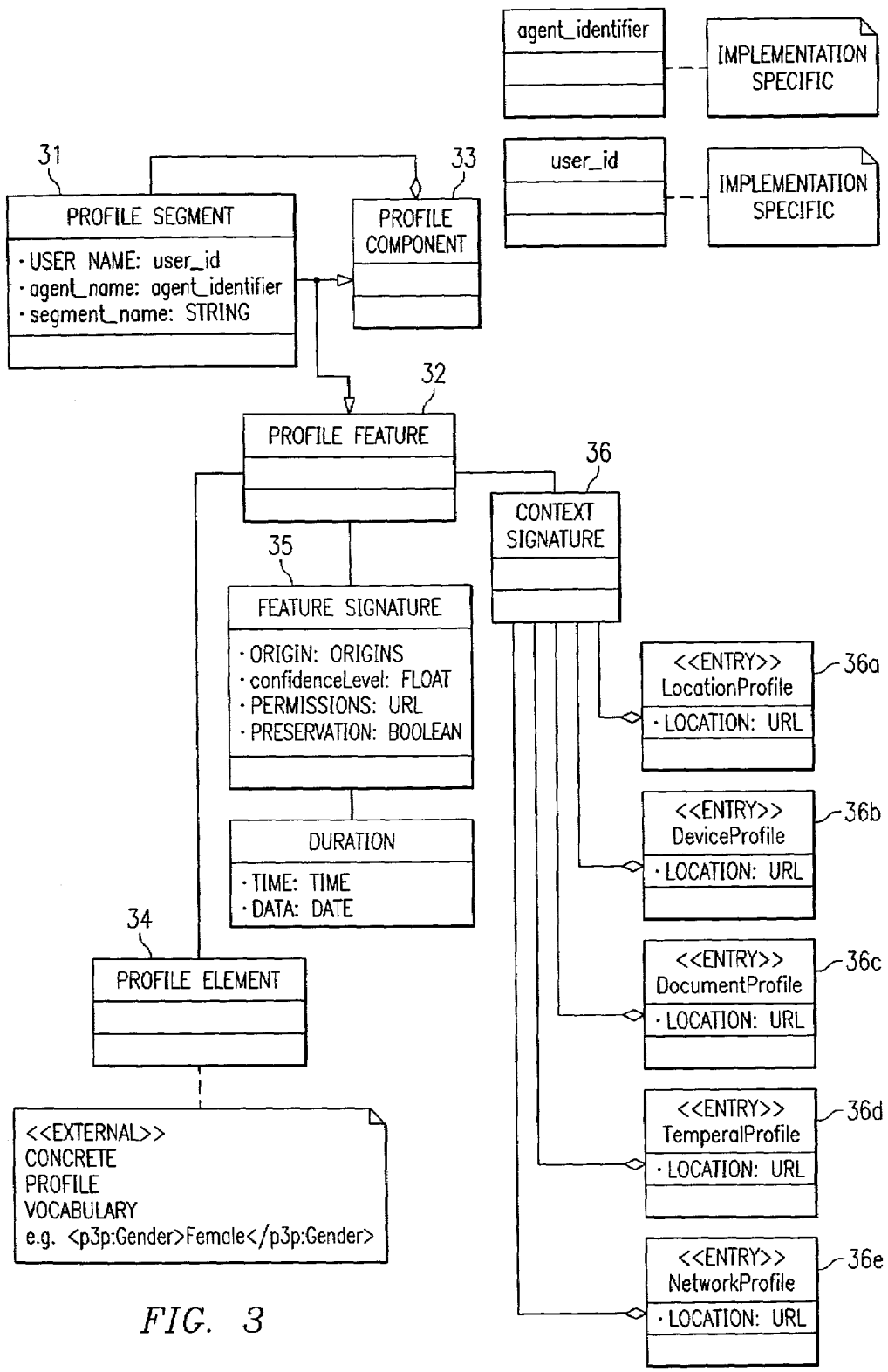
FIG. 3 is a class diagram illustrating the data structure of profile data.

FIG. 3 is a class diagram illustrating the data structure of profile data, referred to herein as the profile data model. A feature of the model is the use of personae. In a simple example, what could differentiate personae is a different set of profile values for the same set of profile attributes. Thus, after 6 pm, a computer station might switch from a first persona that sets a favorite web page set to a work-related page to a second persona that sets a favorite web page to a television guide page. In this manner, context plays a role in defining the persona, that is, the user is at home and it is after 6 pm. In other words, the notions of a digital personae and contextual data are combined.

As explained further below, maintaining distributed profiles (as profile segments) creates profiles that resemble personae, that is, profile data that is context-sensitive as determined by a persona agent 12, a local profiling agent working on behalf of the user. A multitude of personae could be derived from a single profile. Referring again to FIG. 2, the hub 11 handles the distribution of the segments 31 to the persona agents 12.

FIG. 3 explicitly illustrates how a profile is logically composed of profile segments 31. A profile segment 31 is either a primitive profile segment (no children) called a profile feature 32, or a composite segment called a profile component 33 that contains one or more profile segments 32. Each segment 32 is tagged with a user ID of the owner of the segment and an agent ID. The agent ID represents the persona agent responsible for storing and maintaining the segment, and is modifiable.

A profile segment 32 can contain one or more profile features and zero or more profile components. This allows for the profile segment to support concrete profiling models that specify hierarchical or structured layout of its profile elements. This is in contrast to being a flat structure.

A profile feature 32 is a meta-profile construct that combines a single profile element 34 (the profile attribute) with two meta-data elements, a feature signature 35 and a context signature 36.

The profile element 34 may be based on any one of existing or new profile vocabularies, such as those developed by the CPExchange, P3P (Platform for Privacy Preferences), or DublinCore projects.

The context signature 36 makes use of five context elements. These are the location of the activity in question, the network capabilities during the life of the activity, the device capabilities, a characterization of the application, task, or document, and temporal information (time and date). These five elements of context are illustrated as 36a–36e.

A context signature 36 defines the scope of the profile element 34 contained in the profile feature 32. Thus, it defines where, when, and how the profile element 34 is relevant. Unless a user or a profile provider explicitly sets the context signature 36, the semantics of determining the context signature values is a function of the persona agent 12's data mining capabilities. A persona agent 12 analyzes the raw observational data associated with a user and converts it to context-sensitive profile features. Each of the elements 36a–36e of the context signature 36 permits multiplicity. An instance of the same profile element can be relevant in multiple contextual scenarios. For example, if the device profile element 36b references two different device profiles, such as a mobile unit and a PC, it is clear that the profile data is of relevance regardless of whether the user device is stationary or mobile.

The feature signature 35 provides meta-level information about profile data, regardless whether the data is explicitly or implicitly derived. This information permits the capture of data management, categorization, and control information.

Attributes of the feature signature 35 include:
permission preferences, confidence measures, preservation, duration, and origin.

Permission preferences define how access to personal data may be limited. At the same time, preferences provide the ability to grant access to profile data so as to permit personalized, customized, and targeted services rendered by web sites and other applications. An example of a suitable vehicle for permission preferences is the P3P schema, vocabulary, and protocol. P3P allows web sites to express their privacy practices in a standardized format that can be downloaded in a standardized format that allows web browsers and other user agent tools to read them. Then, the user agent can either display information relating to that privacy policy to the user or take action based on previously defined user preferences. In accordance with P3P, a user may declare privacy preferences, using a special language that expresses a preference rule-set. The user agent uses the rule-set to make automated or semi-automated decisions with respect to a data exchange with a P3-Penabled web site.

For purposes of the present invention, a rule-set from a set of standard pre-defined permission profiles is associated with each profile element 34. The task of evaluating the rule-set and taking action is assigned to the persona agent 12 that is hosting the profile data. Specifically, the rule-set is referenced by a URL in the feature signature 35 that is either local to the persona agent 12's host or from a remotely accessible host.

The confidence attribute of the feature signature 35 reflects the fact that much of the profile data managed by a persona agent is the result of data mining from user interaction. These techniques have varying levels of quality, thus a level of confidence is calculated for a profile feature.

The preservation attribute of the feature signature 35 reflects the fact that there are categories of data that will rarely change or be deleted. A profile element can be categorized as historical, thereby allowing it to persist. This may be represented with a Boolean value.

The duration attribute reflects whether the data is time sensitive. A duration period or a time and date may be used to specify an expiration time.

The origin attribute reflects from where the profile data originated. The value set is explicitly declared by the user, computed by the system, or simply explicitly declared by another party, computing or human.

FIG. 4 illustrates an example of a profile segment 40. In the example of FIG. 4, the profile segment 40 has a single profile component, which contains a single profile feature. The profile feature encapsulates a profile element, which in this case is derived from a profile vocabulary. Apparently, a purchase of an appliance has been deemed to be important with a relatively high level of confidence, but not considered to be anything of historical significance. The profile element is both location-independent and temporal-independent, as indicated by the "*" in each case. The purchase must have occurred during an on-line shopping experience via a broadband connection. The item purchase was a breadmaker.

The example of FIG. 4 is very simple. Ultimately, actual implementations could use a more effective means to represent profiling data, such as by using a standard language such as Resource Description Framework (RDF). RDF is an infrastructure that enables the encoding, exchange and reuse of structured metadata. RDF is an application of XML that imposes needed structural constraints to provide unambiguous methods of expressing semantics. RDF additionally provides a means for publishing both human-readable and machine-processable vocabularies designed to encourage the reuse and extension of metadata semantics among disparate information communities. The structural constraints RDF imposes to support the consistent encoding and exchange of standardized metadata provides for the interchangeability of separate packages of metadata defined by different resource description communities. The use of RDF would allow a persona agent 12, for example, to know that a desktop PC and a laptop are both computing devices, and take this fact into consideration when querying or retrieving profile data. This would make for a more rich and more useful representation of profiling data.

Referring again to FIG. 2, a persona agent 12 has three operational modes.

A first operational mode of persona agent 12 is a service mode. In the service mode, the persona agent 12 handles requests from applications, such as application 21, for a user's local profile. This can simply be a request for a complete local profile (in the traditional user profile sense) resulting in the complete local profile communicated in a serialized format such as XML/RDF. Alternatively, an application 21 can place a query-based request calling for a set of profile features matching a given context signature pattern and a feature signature pattern.

For example, using an ad hoc query syntax, an application 21 might request all profile features contained in the given local profile for a user identified as "johndoe565656" signed with a timestamp between 5 pm and 8 am:
  {<up:user_name>="johndoe565656" & (17:00<=<up:temporal_profile><=08:00)}

The resulting data is a profile segment containing zero or more profile features, which were in the context of the given time interval for the given user.

A second operational mode of the persona agent 12 is a learning mode. In this mode, data mining is used to extend and update a user profile. A persona agent 12, using its rules or additional built-in algorithms, analyzes a user's event history. It may attempt to identify new patterns, modify existing assertions (profile features), or commit new assertions in a local profile (profile segment).

A third operational mode of a persona agent 12 is a sync/discover mode. This mode supports the aggregation/disaggregation and construction/deconstruction capabilities of system 10. Depending on the user profiling model being implemented, a persona agent 12 can be configured to potentially support a wide spectrum of behavior. At one end of the spectrum is complete synchronization of its local data with the data of other persona agents 12 representing the same user. At the other end is selective modification of its local data depending on local (agent) rules and querying remote data of other persona agents 12 representing the same user.

The rules for this third mode are of the following form:
  When [conditions] IF [query] THEN [action(s)]

In this manner, a persona agent 12 iterates through a classic rule evaluation strategy. During a recognition phase, all rules are identified whose set of "when" clauses match some profile feature based on a profile element, a context signature pattern, or a feature signature pattern. Each prematched rule then results in a query based on its "if clause" to other persona agents 12. These queries are similar to those used during the agent-application interaction. If the query returns successfully, the "then action" is executed. The action can consist of either modifying the matched profile features context signature or feature signature, deleting the matched profile feature, or asserting a new profile feature.

With this flexible method of specifying the behavior of persona agents 12, a network of persona agents 12 could implement any number of synchronization-based, discovery-based, or emergent profiling models. This capability allows developers of persona agents to build alternative profiling infrastructures that support complex and demanding environments.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A computer-implemented method of collecting and managing user profile data in a data communications network comprising the steps of:
  storing, in a data communications network, persona agents associated with users of a network, wherein the persona agents are interconnected by a network hub; and
  a particular persona agent performing the following tasks:
    collecting observational data from an application used by a user for the purpose of updating user profile data associated with the user,
    receiving a query from the application for a profile segment associated with the user, the profile segment including at least a portion of the user profile data, and
    in response to the query, delivering the profile segment associated with the user to the application;
  wherein at least a portion of the contents of the profile segment delivered to the application is determined by comparing a context data portion of the profile data with a context in which the profile segment was requested by the application.

2. The method of claim 1, wherein the context data is stored as a context signature, operable to permit a profile attribute to have a different value depending on context data.

3. The method of claim 1, wherein the persona agent is further operable to mine the observational data to obtain user profile data.

4. The method of claim 1, wherein the persona agent is operable to act on rules stored in the profile segment to determine privacy preferences of the user.

5. The method of claim 1, wherein the context data comprises data representing one or more from the following groups of data types: the location of an activity, network capabilities, device capabilities, and temporal information.

6. The method of claim 1, wherein the context data defines where and when profile data is relevant to be included in the profile segment.

7. The method of claim 1, further comprising using the persona agent to analyze the observational data and generate context data based on the observational data.

8. The method of claim 1, wherein delivering the profile segment associated with the user to the application includes obtaining the profile segment associated with the user from a persona hub associated with the persona agent.

9. A data processing network for collecting and managing user profile data in a data communications network, comprising:

a number of persona agents, each persona agent associated with a user of the data communications network and operating as a proxy for an application used by the user; and wherein a particular persona agent is communicatively coupled to an application such that the particular persona agent can receive observational data from the application for the purpose of updating user profile data associated with the user, receive a query from the application seeking a profile segment associated with the user, the profile segment including at least a portion of the user profile data, and in response to the query, deliver the profile segment associated with the user to the application; and wherein at least a portion of the contents of the profile segment delivered to the application is determined by comparing a context data portion of the profile data with a context in which the profile segment was requested by the application.

10. The network of claim 9, further comprising at least one persona hub, each hub in data communication with the number of persona agents, wherein the at least one persona hub is stored on network server.

11. The network of claim 9, wherein the persona agents are stored on one or more network servers.

12. The network of claim 9, wherein the persona agents are stored on user devices.

13. The network of claim 9, wherein each persona agent is further operable to mine the observational data to obtain user profile data.

14. The network of claim 9, wherein each persona agent is further operable to act on rules stored in the profile segment to determine privacy preferences of the user.

15. The network of claim 9, wherein multiple persona agents are provided on the data communications network for a particular user.

16. The network of claim 15, wherein the multiple persona agents for the user are stored in different locations on the network.

17. The network of claim 9, wherein the particular persona agent is communicatively coupled to the application such that the particular persona agent can obtain the profile segment associated with the user from a persona hub associated with the persona agent in order to deliver the profile segment to the application.

* * * * *

UNITED STATES PATENT AND TRADEMARK OFFICE
CERTIFICATE OF CORRECTION

| | | |
|---|---|---|
| PATENT NO. | : 7,162,494 B2 | Page 1 of 1 |
| APPLICATION NO. | : 10/157366 | |
| DATED | : January 9, 2007 | |
| INVENTOR(S) | : Javier B. Arellano | |

It is certified that error appears in the above-identified patent and that said Letters Patent is hereby corrected as shown below:

On title page
Item (57) Abstract should read

A data processing method and network for collecting, storing, and providing user profile data. The network comprises a number of persona agents, interconnected to a hub. The persona agents and the hub are stored within the data communications network. Each persona agent is associated with a user of the data communications network, and is operable to collect observational data from an application being executed by the user, as well as to receive queries for profile data from the application and to respond to the querires with context-based profile data.

Signed and Sealed this

Twenty-first Day of August, 2007

JON W. DUDAS
*Director of the United States Patent and Trademark Office*